United States Patent
Weinzierl et al.

(10) Patent No.: US 6,493,595 B1
(45) Date of Patent: Dec. 10, 2002

(54) METHOD FOR ADJUSTING SEVERAL CONTROLLERS USED TO CONTROL A CONTROLLED SYSTEM CONSISTING OF COUPLED CONTROLLED MEMBERS

(75) Inventors: Klaus Weinzierl, München (DE); Karl-Heinz Kirchberg, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/462,526
(22) PCT Filed: Jul. 3, 1998
(86) PCT No.: PCT/DE98/01848
§ 371 (c)(1), (2), (4) Date: Jan. 7, 2000
(87) PCT Pub. No.: WO99/03024
PCT Pub. Date: Jan. 21, 1999

(30) Foreign Application Priority Data

Jul. 10, 1997 (DE) .......................... 197 29 632

(51) Int. Cl.$^7$ ................................. G05B 11/01
(52) U.S. Cl. ............................. 700/20; 19/29
(58) Field of Search ........................ 700/19, 20, 29

(56) References Cited

U.S. PATENT DOCUMENTS

| | | | | |
|---|---|---|---|---|
| 5,335,164 A | * | 8/1994 | Gough, Jr. et al. | 700/29 |
| 5,557,682 A | * | 9/1996 | Warner et al. | 381/71.11 |
| 5,610,843 A | * | 3/1997 | Chou | 702/109 |
| 5,777,881 A | * | 7/1998 | Kanno | 700/209 |

FOREIGN PATENT DOCUMENTS

DE 36 18 025 A1 * 3/1987 ........... G05B/13/04

OTHER PUBLICATIONS

H. Unbehauen: "Regelungstechnik III", (1993), Friedrich Vieweg & Sohn Verlagsgesellschaft, Braunschweig/Wiesbaden XP002091595, pp. 118–132.*
O. Follinger, "Regelungstechnik", (1992), Huthig Buch Verlag, Heidelberg, XP002091596, pp. 365–386.*

* cited by examiner

Primary Examiner—Thomas Black
Assistant Examiner—Ronald D Hartman, Jr.
(74) Attorney, Agent, or Firm—Harness, Dickey & Pierce P.L.C.

(57) ABSTRACT

A method automatically determines, controller parameters of a plurality of controllers for controlling a process controlled system that is composed of a plurality of coupled control systems. The controller parameters of the respective controllers are calculated from the measured responses or the individual control systems, being calculated by a computer for equivalent transfer functions that consider couplings between control systems in the, process controlled system. This occurs in an iterative method, in which a multi-dimensional, non-linear equation system is supplied step-by-step to an optimized solution A, a solution is individually calculated for each non-linear equation, that enters into the other equations. A different standard method for solving non-linear equation systems can also be utilized. A primary application is envisioned for: setting a furnace having a plurality of heating zones.

7 Claims, 3 Drawing Sheets

METHOD FOR ADJUSTING SEVERAL CONTROLLERS USED TO CONTROL A CONTROLLED SYSTEM CONSISTING OF COUPLED CONTROLLED MEMBERS

BACKGROUND OF THE INVENTION

1. Field of the Invention

The invention is directed to a method for setting a plurality of controllers for controlling a process controlled system composed of coupled control systems.

2. Description of the Related Art

In commonly used control systems without decoupling filters, as can often be encountered in practice, independent control systems are assumed for simplification for using manual initialization. Existing couplings between control systems can usually not be clearly recognized and are therefore frequently ignored. When, however, such couplings between control systems exist in application, then the initialization or readjustment of a control system affects other control systems in the overall control system.

In this situation the manual setting is accomplished in a plurality of steps, in which parameters of a controller are modified in order, to quickly compensate a rated value different when setting a new rated value, among other things moreover when, an overshooting can occurs in the control circuits, the controller parameters must be readjusted in the coupled control systems, so that the control circuits work satisfactorily. Each-therefor adjustment of the controller parameters in a control system clearly effects a modification of the control circuits in the control systems that have a coupling (of different extents) to the adjusted control system. When a process controlled system contains a plurality of control systems, the initialization is a lengthy and tiresome one must wait for the stationary condition of the overall process control system before every modification and control circuits that are already set are readjusted with progressive initialization due to the modifications of other controllers.

SUMMARY OF THE INVENTION

In a processed controlled system composed of a plurality of control systems, the object of the invention is to undertake a setting of the in which therefore, only measured values for the transient response of the systems are employed in order to be able to set the parameters of the controllers all at once.

This object is achieved a method for setting a plurality of controllers for controlling a process controlled system having coupled control systems, comprising the steps of determining a transfer function from a type of a respective controller, implementing, for each control circuit, measurements of setting signals and output signals of the process controlled system, determining, from these measurements, transfer functions for the coupled control systems contained in the process controlled system and their couplings, calculating, for each controller, an equivalent path that utilizes the couplings with other control systems in the process controlled system, and iteratively determining, for each respective coupled control system, controller parameters utilizing couplings with the other control systems for each respective controller until a predetermined quality has been reached.

With the inventive method, the respective controller parameters are calculated for each controller in a process controlled system composed of a plurality of control systems, in which the measured values for the transient response of the process controlled system are necessary in order to automatically determine all of the control parameters. The initialization of, for example, a furnace that is composed of a plurality of heating zones is thus accomplished in one step, since the manual iteration is eliminated because this initialization is automatically implemented on a computer. This implementation is possible because the couplings are also taken into consideration in the inventive method and, in contrast to the manual setting method, the controller parameters are modified based on the behavior of multiple control system. A considerable time saving is achieved because the required iterations for optimizing the controllers are implemented in a computer. Transient response events of temperature control systems can be simulated significantly faster on computer.

A further advantage of the invention is that controller settings can be reproduced and are thus less dependent on the experience level of the person undertaking the setting.

In general, automatic optimization is more economical than the described, manual iteration method, since resources are not wasted.

The automatically determined controller settings lie in the immediate proximity of a possible optimum setting, which enables an economical operation of the system.

Further, the automatic design method supplies a "reference" that can be employed for judging an optimization potential of a complex system.

It is an additional advantage of the invention that the noise behavior is also taken into consideration in the automatic controller setting. This contrast with the manual controller settings which are frequently only undertaken for the management behavior.

Further, it is also possible to reduce the plurality of required iterations on the computer by utilizing modern numerical methods.

A transfer function is determined for each controller A PID controller has the typical controller parameters "proportional part P", "integrating part I" and "differentiating part D" available to it. In control technology, the corresponding transfer function for different types of controllers are adequately known to a person skilled in the art, usually in frequency-dependent presentation with Laplace operators $s=j\omega$.

As mentioned, measurements are implemented at the process controlled system, in which a transient behavior is registered for each control system to be taken into consideration. The transient behavior of each control system in the process controlled system is thus available and one knows the type of controller. An equivalent system is now calculated that takes couplings of the respective control system with other control systems into consideration. By knowing of this control system, it is possible to calculate the controller parameters for each controller of a control circuit in iterative steps, in which a separate presentation of the controller parameters dependent on other controller parameters exists for each control system and, as a result of the computer, the proper controller parameters for each control circuit are respectively identified with the controller parameters of the coupled control systems that have already been calculated. These parameters enter into the other equations that comprise a coupling to the control system. In a next step, the controller parameters of the next controller are optimized, etc.

One development of the invention is comprised in calculating the controller parameters for the respective controller of a control system in that a zero point search of a presentation present in implicit form that contains the transfer functions of all controllers, systems and couplings is implemented, whereby an iterative Newton method can also be applied.

Another development of the invention is comprised in implementing the setting of the plurality of controllers of the process controlled system with non-linear controller parameterization methods, preferably with a neural network (neural controller parameterization method).

One application of the inventive method is in an initialization of a furnace composed of a plurality of heating zones, e.g., for burning bricks, in which fixed demands are made of the temperature curve within the furnace.

Other applications of the invention are for combined pressure/flow controls in supply lines or temperature/humidity controls in air conditioning systems.

One development of the invention is comprised in the use of a processed control system that is composed of at least two control systems and is controlled with at least two controllers.

Developments of the invention are discussed below.

Exemplary embodiments of the invention are presented in greater detail on the basis of the following figures.

The invention is explained below on the basis of a process controlled system having 2 control systems, i.e., with 2 inputs and two outputs. The expansion for the case of more than 2 inputs and outputs is described afterwards.

DESCRIPTION OF THE PREFERRED EMBODIMENT

Description and Identification of a Multi-Quantity System

Figure 1:
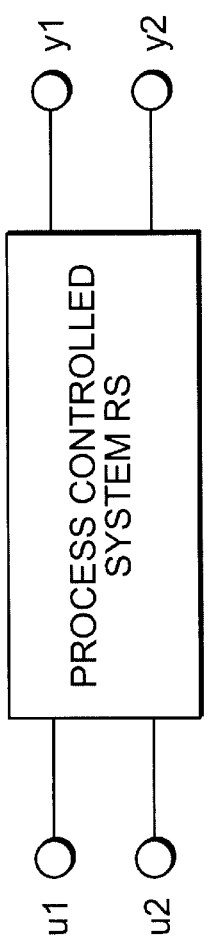
FIG. 1 is a block diagram that shows a process controlled system having two manipulated quantities and two regulating variables.

FIG. 1 shows a process controlled system RS having two manipulated variables $u_1$ and $u_2$ and two regulating variables $y_1$ and $Y_2$.

For an exemplary water faucet having a hot water wheel and a cold water wheel, the quantity $u_1$ and $u_2$ respectively characterizes the position of the hot water or, respectively, of the cold water wheel. The regulating variables $y_1$ and $y_2$ respectively denote the water temperature and the volume stream of the water (water flow).

Possible applications of such a system include control circuits for pressure and temperature of a boiler, a steam turbine, a furnace with a plurality of heating zones, (e.g., for burning bricks), air temperature and air humidity for air conditioning controls.

The following is valid in the frequency domain given a linear, time-invariant multiple-quantity system with two manipulated quantities and two regulating variables:

$$\begin{bmatrix} Y_1(s) \\ Y_2(s) \end{bmatrix} = \begin{bmatrix} H_{11}(s) & H_{12}(s) \\ H_{21}(s) & H_{22}(s) \end{bmatrix} \cdot \begin{bmatrix} U_1(s) \\ U_2(s) \end{bmatrix}, \quad (1)$$

where
- s denotes the Laplace variable ($s=j\omega$)
- $Y_i(s)$, $u_i(s)$ denotes the Laplace transform of $y_i$ and $u_i$ (i=1,2);
- $H_{12}$, $H_{22}$ sub-transfer functions of the diagonals (main path, main branches);
- $H_{12}$, $H_{21}$ denotes sub-transfer functions of the subsidiary diagonals (couplings).

The sub-transfer functions are obtained by evaluating equation (1) for $U_1(s)$ or, respectively, for $U_2(s)$, i.e., $$H_{11}(s) = \frac{Y_1(s)}{U_1(s)}\bigg|_{U_2(s)=0}$$

$$H_{12}(s) = \frac{Y_1(s)}{U_2(s)}\bigg|_{U_1(s)=0}$$

$$H_{21}(s) = \frac{Y_2(s)}{U_1(s)}\bigg|_{U_2(s)=0} \quad \text{and}$$

$$H_{22}(s) = \frac{Y_2(s)}{U_2(s)}\bigg|_{U_1(s)=0}$$

A measurement of the system frequency responses for $s=j\omega$ in a given application occurs in that the manipulated variable $u_1$ is adjusted first and the manipulated variable $u_2$ is retained. Both regulating variables $y_1$ and $y_2$ are registered. Subsequently, the manipulated variable $u_1$ is retained and the manipulated variable $u_2$ is adjusted. Regulating variables $y_1$ and $y_2$ are again registered. Overall, accordingly, four reply signals to four input signals for the four sub-transfer functions $H_{11}(s)$, $H_{12}(s)$, $H_{21}(s)$ and $H_{22}(s)$ in the indicated sequence.

DECENTRALIZED DESIGN WITHOUT DECOUPLING FILTER

Figure 2:
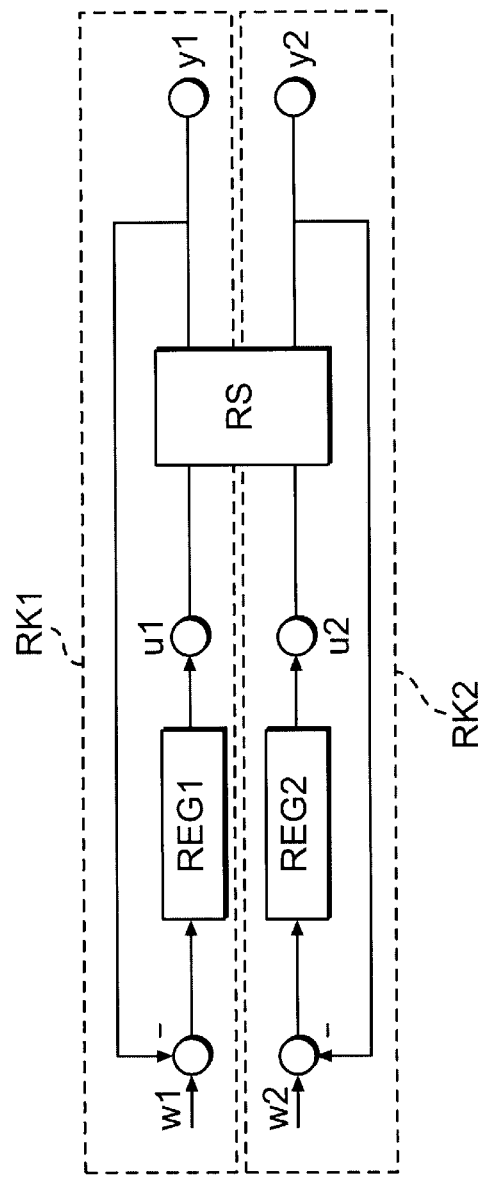
FIG. 2 is a block diagram that shows a process controlled system having two controllers and without a decoupling filter.

FIG. 2 shows the structure of a process controlled system RS without a decoupling filter, having a controller one REG1, a controller two REG2 reference quantities $w_1$ and $w_2$, and two control circuits RK1 and RK2. This control structure is frequently employed in practice since it is often assumed in the initialization that two independent process controlled systems, i.e., the two main paths having the transfer functions $H_{11}(s)$ and $H_{22}(s)$ are present. Existing couplings with the transfer functions $H_{12}(s)$ and $H_{21}(s)$ can often not be clearly recognized or are often simply left out of consideration. In many instances, this control structure is selected because the design, the initialization, and the maintenance of preceding decoupling filters is complicated. This, for example, is the case when couplings change frequently due to remodelings, utilization of different operating means (catalysts) or fluctuating product quantities, or when an installation of decoupling filters is not technically possible in an existing automated process. This is the case when economical discrete controllers are utilized in a system for cost reasons or when the process quantities affected lie in system parts that are controlled with separate systems.

Figure 3:
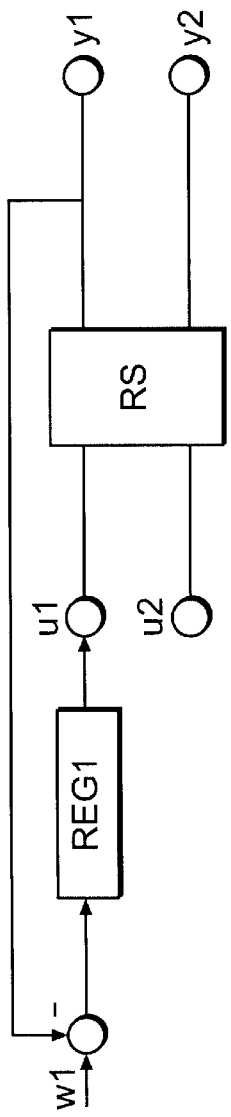
FIG. 3 is a block diagram that illustrates the situation before initialization of the second control circuit.

The problems with the initialization of a process controlled system without decoupling filters are discussed in greater detail below. It is assumed for this purpose that the control circuit RK1 for the first main path has already been closed, and the initialization of the second control circuit is to take place (also see FIG. 3). The transfer function of the equivalent path $H_{20}(s)$ is important for the initialization of the second control circuit RK2, whereby $$H_{20}(s) = \frac{Y_2(s)}{U_2(s)}$$

the transfer is calculated below. The argument "(s)" is omitted below for the sake of clarity.

The transfer functions of the two controllers REG1 and REG2 are referenced below as $H_{R1}$ and $H_{R2}$. The reference quantity $w_1$ is to be set to zero for the calculation. Following from equation (1) is $$\frac{Y_2}{U_2} = \frac{H_{21}U_1 + H_{22}U_2}{U_2} = H_{22} + H_{21}\frac{U_1}{U_2} \quad (1a)$$

The quantity $U_1$ is to be eliminated from this equation (1a), i.e., to be expressed by $U_2$. Initially following is:

$$U_1 = -H_{R1}Y_1 = -H_{R1}[H_{11}U_1 + H_{12}U_2].$$

By solving for $U_1$, $$U_1 + H_{R1}H_{11}U_1 = -H_{R1}H_{12}U_2$$

$$U_1 = \frac{-H_{R1}H_{12}U_2}{1 + H_{R1}H_{11}}$$

and insertion into equation (1a), the equation $$H_{20} = H_{22} - \frac{H_{12}H_{21}H_{R1}}{1 + H_{R1}H_{11}} \quad (2)$$

follows. The controller two REG2, illustrated by its transfer function $H_{R2}$, thus does not "see" the main path $H_{22}$ in the initialization but the equivalent path $H_{20}$, which differs from $H_{22}$ given couplings $H_{11}$ and $H_{21}$, that do not disappear and that is dependent on the setting of the controller one REG1.

Analogous to equation (1), the equivalent path $H_{10}$, which is dependent on the controller two REG2, follows for the controller one REG1 instead of the main path $H_{11}$:

$$H_{10} = H_{11} - \frac{H_{12}H_{21}H_{R2}}{1 + H_{R2}H_{22}} \quad (3)$$

The following difficulty thus derives in the initialization of the control structure: when, given an open, second control circuit ($H_{R2}=0$), the controller one REG1 is parameterized with the transfer function $H_{R1}$, then this is set for the main path $H_{11}$, since the back term in equation (3) is eliminated with $H_{R2}=0$.

The subsequent parameterization of the controller two REG2 is based on equivalent path $H_{10}$ according to equation (2). When the second control circuit RK2 is closed, then the behavior of the first control circuit RK1 is detuned, since $H_{R2}=0$ is no longer valid. The first control circuit RK1 is readjusted, which is turn leads to a detuning of the second control circuit RK2 due to the change of $H_{R1}$ in equation (2).

The initialization is thus time-consuming since, readjustment must be repeatedly carried out and, one must furthermore always wait for the stationary condition.

The invention enables a setting (parameterization) of the controller parameters without manual repeated adjustments and without waiting for the stationary condition. An initialization tool is required as basis wherein a controller is allocated to a control system, as expressed by the operator equation $$H_R = \Im\{H\} \quad (4)$$

This allocation can take place with a neural network having a preceding data pre-precessing: in the data pre-processing, characteristic quantities are first formed from the measured transfer function of the control system; the neural network then determines the appertaining controller parameters from these characteristic quantities (neural parameterization).

After an adequate number of iterations, the initialization method then approximates—in the boundary case—the equations $$H_{R1} = \Im\{H_{10}\} \quad (5)$$

$$H_{R1} = \Im\{H_{20}\} \quad (6)$$

i.e., the two controllers are respectively designed for equivalent paths. By insertion of equation (3) and equation (2) into equations (5) and (6), the following follows:

$$H_{R1} = \Im\left\{H_{11} - \frac{H_{12}H_{21}H_{R2}}{1 + H_{R2}H_{22}}\right\} \quad (7)$$

and $H_{R2} = \Im\left\{H_{22} - \frac{H_{12}H_{21}H_{R1}}{1 + H_{R1}H_{11}}\right\}$, i.e. $0 = \Im\left\{H_{11} - \frac{H_{12}H_{21}H_{R2}}{1 + H_{R2}H_{22}}\right\} - H_{R1}$ and $0 = \Im\left\{H_{22} - \frac{H_{12}H_{21}H_{R1}}{1 + H_{R1}H_{11}}\right\} - H_{R2}.$ \quad (8)

Since $H_{11}$, $H_{12}$, $H_{21}$ and $H_{22}$ are given and $H_{R1}$ and $H_{R2}$ are sought, it becomes clear that equation (7) and equation (8) cannot be solved independently of one another but represent a non-linear equation system for determining $H_{R1}$ and $H_{R2}$.

When PID controllers are employed both as controller one REG1 as well as controller two REG2, then $$H_{R1}(s) = K_{P1}\left(\frac{1}{sT_{N1}} + 1 + \frac{sT_{V1}}{1 + sT_{V1}/V}\right), \quad (9)$$

$$H_{R2}(s) = K_{P2}\left(\frac{1}{sT_{N2}} + 1 + \frac{sT_{V2}}{1 + sT_{V2}/V}\right), \quad (10)$$

whereby $K_{P1}$, $K_{P2}$, $T_{N1}$, $T_{N2}$, $T_{V1}$, $T_{V2}$ represent parameters of the PID controllers REG1 and REG2 (index 1 or, respectively, 2 for the number of the controller). A parameter V is permanently prescribed, i.e., is not optimized. In the example cited here, equations (7) and (8) represent a non-linear equation system with 6 equations for 6 unknowns.

The following steps are required for calculating the controller $H_{R1}$ given initially predetermined controller coefficients $K_{P2}$, $T_{N2}$ and $T_{V2}$:

1. Calculation of the controller frequency response according to equation (10) dependent on the controller parameters $K_{P2}$, $T_{N2}$ and $T_{V2}$;
2. Calculation of the equivalent path frequency response $H_{10}$ by insertion of the frequency responses $H_{R2}$ and of the path ($H_{11}$, $H_{12}$, $H_{21}$ and $H_{22}$) for $s=j\omega$ in equation (3);

3. Controller calculation based on the frequency response $H_{10}(j\omega)$ of the equivalent path (this step is formally covered with equation (5)).

These steps are combined to form a sub-program. The interface of the sub-program is formally described by $$\begin{bmatrix} K_{P1} \\ T_{N1} \\ T_{V1} \end{bmatrix} = F(H_{11}, H_{12}, H_{21}, H_{22}, K_{P2}, T_{N2}, T_{V2}).$$

The sub-program explains equation (5) for the case of a parameterization of PID controllers. This sub-program can likewise be employed for the presentation of equation (6), i.e., $$\begin{bmatrix} K_{P2} \\ T_{N2} \\ T_{V2} \end{bmatrix} = F(H_{22}, H_{21}, H_{12}, H_{11}, K_{P1}, T_{N1}, T_{V1}).$$

A compressed presentation can likewise be recited, i.e., $$\begin{bmatrix} K_{P1} \\ T_{N1} \\ T_{V1} \\ K_{P2} \\ T_{N2} \\ T_{V2} \end{bmatrix} = \begin{bmatrix} F(H_{11}, H_{12}, H_{21}, H_{22}, K_{P2}, T_{N2}, T_{V2}) \\ F(H_{22}, H_{21}, H_{12}, H_{11}, K_{P1}, T_{N1}, T_{V1}) \end{bmatrix}. \quad (11)$$

This non-linear equation system can be solved with an arbitrary standard method, for example with a Newton method.

The above comments can be generalized to the case of a process controlled system having n inputs and n outputs. The following equation system is formulated for this purpose (PID controllers are again employed):

$$\begin{bmatrix} K_{P1} \\ T_{N1} \\ T_{V1} \\ K_{P2} \\ T_{N2} \\ T_{V2} \\ \vdots \\ K_{Pn} \\ T_{Nn} \\ T_{Vn} \end{bmatrix} = \begin{bmatrix} F(H_{11}, H_{12}, \ldots, H_{nn}, K_{P2}, T_{N2}, T_{V2}, K_{P3}, T_{N3}, T_{V3}, \ldots, K_{Pn}, T_{Nn}, T_{Vn}) \\ F(H_{22}, H_{21}, \ldots, H_{nn}, K_{P1}, T_{N1}, T_{V1}, K_{P3}, T_{N3}, T_{V3}, \ldots, K_{Pn}, T_{Nn}, T_{Vn}) \\ \vdots \\ F(H_{nn}, H_{n2}, \ldots, H_{11}, K_{P2}, T_{N2}, T_{V2}, K_{P3}, T_{N3}, T_{V3}, \ldots, K_{P1}, T_{N1}, T_{V1}) \end{bmatrix}. \quad (12)$$

As in the case of the process controlled system having two inputs and two outputs, each line on the right side of equation (12) stands for a sub-program that is called with different parameter values. The parameters of a $k^{th}$ line ($1 \leq k \leq n$) is obtained from the first line, in that "k" is written instead of "1" and "1" is written instead of "k" in the indices without modifying the sequence of the parameters.

Figure 4:
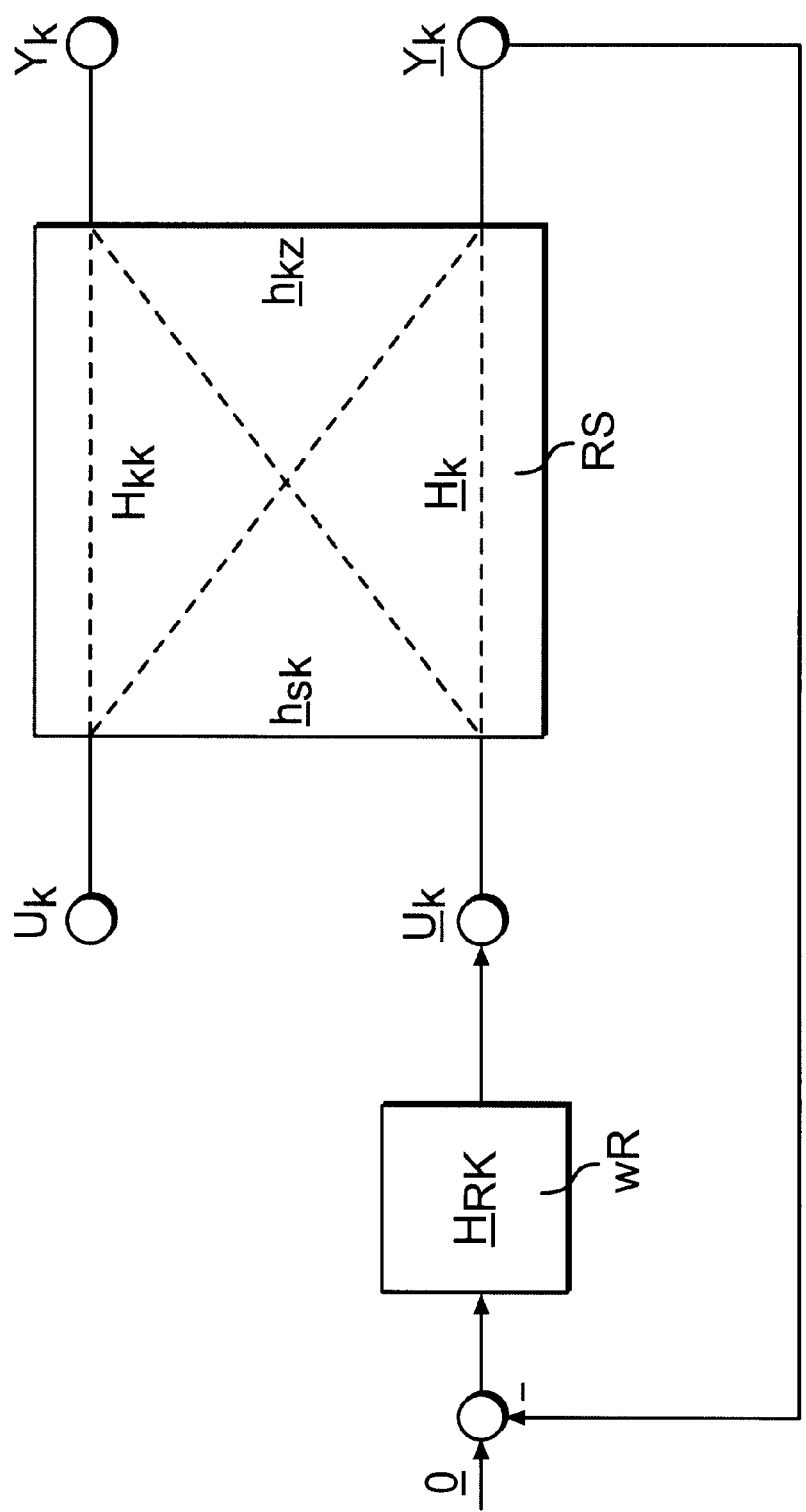
FIG. 4 is a block diagram that shows a general dependency of a control system on a plurality of coupled control systems.

Equivalent path $H_{k0}$ is calculated below in the general case with reference to FIG. 4.

A generalized control system is given:

$$\underline{Y} = \underline{H} \cdot \underline{U} \quad (13)$$

with $\underline{Y} = \begin{bmatrix} Y_1 \\ Y_2 \\ \vdots \\ Y_n \end{bmatrix}$ and $\underline{U} = \begin{bmatrix} U_1 \\ U_2 \\ \vdots \\ U_n \end{bmatrix}$, \quad (13a,b)

and $\underline{H} = \begin{bmatrix} H_{11} & H_{12} & \ldots & H_{1n} \\ H_{21} & H_{22} & \ldots & H_{2n} \\ \vdots & \vdots & \ddots & \vdots \\ H_{n1} & H_{n2} & \ldots & H_{nn} \end{bmatrix}.$ \quad (13c)

The transfer function of the equivalent path $H_{k0}$ is sought:

$$H_{k0} = \frac{Y_k}{U_k} \quad (15)$$

which is the transfer function that derives given an open $k^{th}$ control circuit and other control circuits that are otherwise closed.

The following vectors are introduced for this purpose (the raised 'T' indicates that it relates to a transposed vector):

$$\underline{Y}_k = [Y_1 \ldots Y_{k-1}\ Y_{k+1} \ldots Y_n]^T \quad (16)$$

$$\underline{U}_k = [U_1 \ldots U_{k-1}\ U_{k+1} \ldots U_n]^T \quad (17)$$

$$\underline{h}_{sk} = [H_{1k}\ H_{2k} \ldots H_{k-1,k}\ H_{k+1,k} \ldots H_{nk}]^T \quad (18)$$

$$\underline{h}_{kz} = [H_{k1}\ H_{k2} \ldots H_{K,k-1}\ H_{k,k+1} \ldots H_{kn}] \quad (19),$$

where the following apply $Y_k$ output signals without $Y_k$, $U_k$ setting signals without $U_k$, $h_{sk}$ the $k^{th}$ column of H without $H_{kk}$; and $h_{kz}$ the $k^{th}$ row of H without $H_{kk}$.

Furthermore, a remainder matrix without a $k^{th}$ row and without a $k^{th}$ column is calculated:

$$H_k = \begin{bmatrix} H_{1,1} & H_{1,2} & \ldots & H_{1,k-1} & H_{1,k+1} & \ldots & H_{1,n} \\ \vdots & \vdots & \ddots & \vdots & \vdots & \ddots & \vdots \\ H_{k-1,1} & H_{k-1,2} & \ldots & H_{k-1,k-1} & H_{k-1,k+1} & \ldots & H_{k-1,n} \\ H_{k+1,1} & H_{k+1,2} & \ldots & H_{k+1,k-1} & H_{k+1,k+1} & \ldots & H_{k+1,n} \\ \vdots & \vdots & \ddots & \vdots & \vdots & \ddots & \vdots \\ H_{n,1} & H_{n,2} & \ldots & H_{n,k-1} & H_{n,k+1} & \ldots & H_{n,n} \end{bmatrix}. \quad (20)$$

What follows is:

$$Y_k = H_{k1}U_1 + H_{k2}U_2 + \ldots + H_{kn}U_n = H_{kk}U_k + \underline{h}_{kz}\underline{U}_k \quad (21).$$

To eliminate the vector $U_k$, $U_k$ can be expressed via the controller $Y_k$, i.e., with $$H_{rk} = \text{diag}[H_{R,1} H_{R,2} \ldots H_{R,k-1} H_{R,k+1} \ldots H_{R,n}] \quad (22)$$

applies $$\underline{U}_k = -\underline{H}_{Rk} \underline{Y}_k \quad (23)$$

and with $$\underline{Y}_k = \underline{H}_k \underline{U}_K + \underline{h}_{sk} U_k \quad (24)$$

then it follows that $$\underline{U}_k = -\underline{H}_{Rk} \underline{H}_k \underline{U}_k -$$

$$\underline{H}_{Rk} \underline{h}_{sk} U_k \Leftrightarrow$$

$$\Leftrightarrow (\underline{E} + \underline{H}_{Rk} \underline{H}_k) \underline{U}_k =$$

$$-\underline{H}_{Rk} \underline{h}_{sk} U_k \Leftrightarrow$$

$$\Leftrightarrow \underline{U}_k = -(\underline{E} +$$

$$\underline{H}_{Rk} \underline{H}_k)^{-1} \underline{H}_{Rk} \underline{h}_{sk} U_k \quad (25)$$

When equation (25) is inserted into equation (21) the following derives:

$$Y_k = H_{kk} U_k - h_{kz}(E + H_{RK} H_K)^{-1}$$

$$H_{RK} h_{sk} U_K \quad (26)$$

When, further, equation (15) is co-considered for the sought equivalent path, then it follows that $$H_{k0} = H_{kk} - h_{kz}(E + H_{RK} H_K)^{-1}$$

$$H_{RK} h_{sk} \quad (27)$$

equation (3) is obtained for n=2 from equation (27) given k=1 and equation (2) is obtained given k=2.

The equations $$k=1: 0 \Im \{h_{11} - \underline{h}_{1z}(\underline{E} + \underline{H}_{R1} \underline{H}_1)^{-1}$$

$$\underline{H}_{R1} \underline{h}_{s1}\} - H_{R1}$$

$$k=2: 0 = \Im\{H_{22} - h_{2z}(\underline{E} +$$

$$\underline{H}_{R2} \underline{H}_2)^{-1} \underline{H}_{R2} \underline{h}_{s2}\} -$$

$$H_{R2} \quad (28)$$

$$\ldots$$

$$k=n: 0 = \Im\{H_{nn} - \underline{h}_{nz}(\underline{E} +$$

$$\underline{H}_{Rn} \underline{H}_n)^{-1} \underline{H}_{Rn} \underline{h}_{sn}\} - H_{Rn}$$

arise for the case of n controllers.

Figure 5:
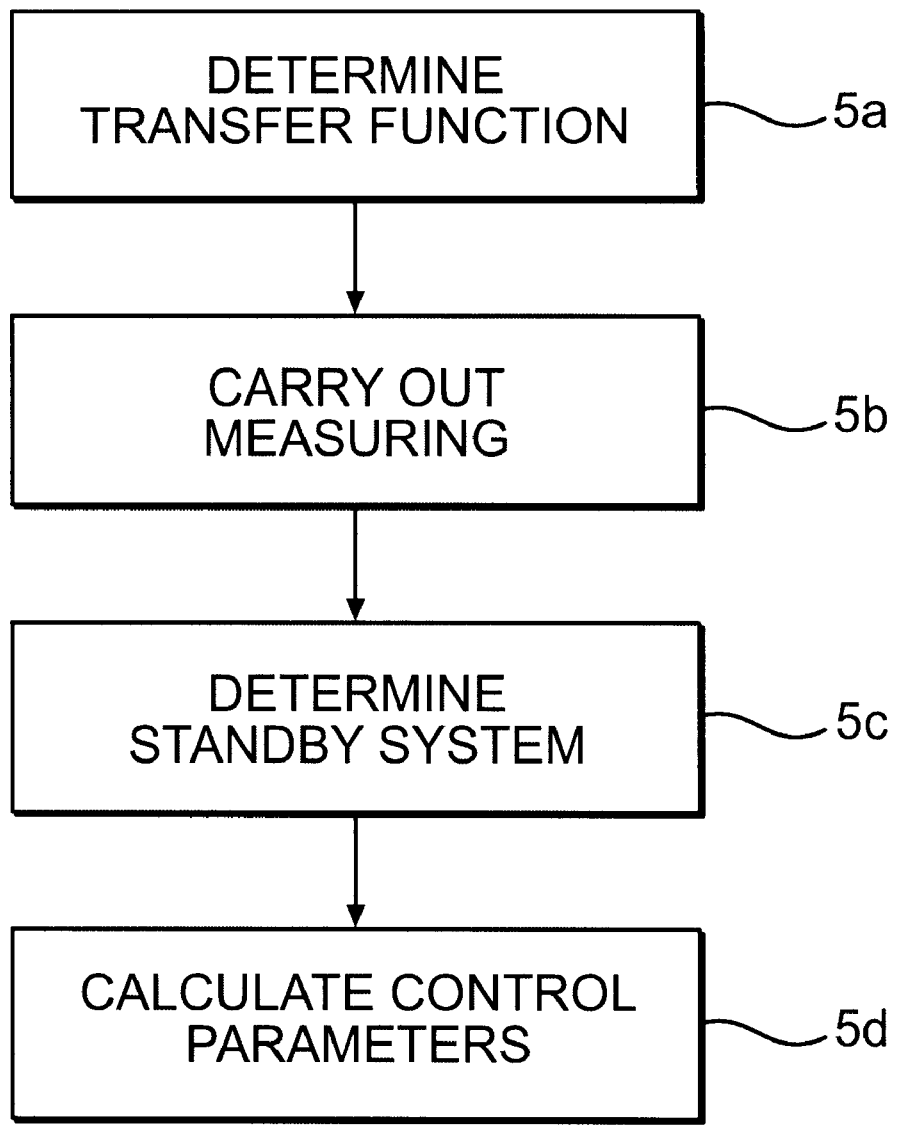
FIG. 5 is a block flow diagram that illustrates steps of a method for controller setting.

FIG. 5 shows the steps of the invention. In step 5a, the transfer functions of the controllers are determined in general dependent on the controller parameters (see equations (9) and (10)). Subsequently, measurements of the reply signals for each control system including all couplings are implemented in step 5b and a path transfer matrix H(s) is calculated, (see equation (1).) The couplings between the control systems contained in the process controlled system are taken into consideration in the form of an equivalent system for each control circuit in step 5c (see equations (2) and (3)). Finally, the controller parameters for each controller are identified in step 5d from the equivalent functions, in that the non-linear equation system that has arisen is iteratively solved (see equation (11)). To that end, the individual equations are brought into a form for zero place calculation (see equation (11) after subtracting the right-hand side), so that this zero place calculation for varying controller parameters is implemented in the form of a sub-program on the computer specifically provided for this purpose. The result is returned from the sub-program and represents all of the sought controller parameters.

We claim:

1. A method for setting a plurality of controllers for controlling a process controlled system having coupled control systems, comprising the steps of:

determining, in said process controlled system, a transfer function from a type of a respective controller;

measuring setting signals, and output signals for each control circuit, of said process controlled system;

determining, from said measurements, transfer functions for said coupled control systems contained in said process controlled system and their couplings;

calculating, for each controller, an equivalent path that utilizes said couplings with other control systems in said process controlled system;

iteratively determining, for each respective said coupled control system, controller parameters utilizing couplings with other said control systems for each respective controller until a predetermined quality has been reached.

2. A method according to claim 1, wherein said step of iteratively determining controller parameters further comprises the step of:

iteratively determining at least one zero place of an equation system comprising at least one equation that utilizes said couplings with the other control systems.

3. A method according to claim 2, wherein said step of iteratively determining at least one zero place utilizes a Newton method as a standard method for solving non-linear equation systems.

4. A method according to claim 1, further comprising the step of utilizing a neural controller as a non-linear controller parameterization method.

5. A method according to claim 1, further comprising the step of controlling a furnace with a plurality of heating zones.

6. A method according to claim 1, further comprising the step of solving respective transfer functions for two controllers with two manipulated quantities and two regulating variables given transfer functions of control systems, wherein said step of solving respective transfer functions utilizes an equation system following form:

$$0 = \Im \left\{ H_{11} - \frac{H_{12} H_{21} H_{R2}}{1 + H_{R2} H_{22}} \right\} - H_{RI}$$

$$\text{and } 0 = \Im \left\{ H_{22} - \frac{H_{12} H_{21} H_{RI}}{1 + H_{RI} H_{11}} \right\} - H_{R2},$$

wherein $\Im\{\ \}$ indicates a steadily differentiable operator;

$H_{ij}$ indicates said transfer functions of said control system (with i, j={1, 2}); and $\underline{H}_{Ri}$ indicates said transfer function of said controller i.

7. A method according to claim 1, further comprising the step of solving respective transfer functions for N controllers having N manipulated variables and N regulating variables given transfer functions of control systems, wherein said step of solving respective transfer functions utilizes an equation system (N equations) in the following form:

$$0 = \Im\{H_{11} - \underline{h}_{1z}(\underline{E} + \underline{H}_{R1}\underline{H}_1)^{-1}\underline{H}_{R1}\underline{h}_{s1}\} - H_{R1},$$
$$0 = \Im\{H_{22} - \underline{h}_{2z}(\underline{E} + \underline{H}_{R2}\underline{H}_2)^{-1}\underline{H}_{R2}\underline{h}_{s2}\} - H_{R2},$$
$$0 = \Im\{H_{nn} - \underline{h}_{nz}(\underline{E} + \underline{H}_{Rn}\underline{H}_n)^{-1}\underline{H}_{Rn}\underline{h}_{sn}\} - H_{Rn},$$

wherein $\Im\{\ \}$ indicates a steadily differentiable operator;

$H_{ij}$ indicates transfer functions of the control system with i, j={1, 2, . . . n});

$\underline{H}_{Ri}$ indicates the transfer function of the controller, $\underline{H}_{rk}$ diag indicates a diagonal matrix with controller transfer functions without $H_{kk}$;

$\underline{h}_{sk}$ indicates the $k^{th}$ column of $\underline{H}$ without $H_{kk}$;

$\underline{h}_{kz}$ indicates the $k_{th}$ row of $\underline{H}$ without $H_{kk}$; and $\underline{E}$ indicates the unit matrix.

* * * * *